Aug. 28, 1951  T. E. ROSS  2,566,144
HYDRAULIC LIFT FOR MOWER SICKLE BARS
Filed July 5, 1949  6 Sheets-Sheet 1
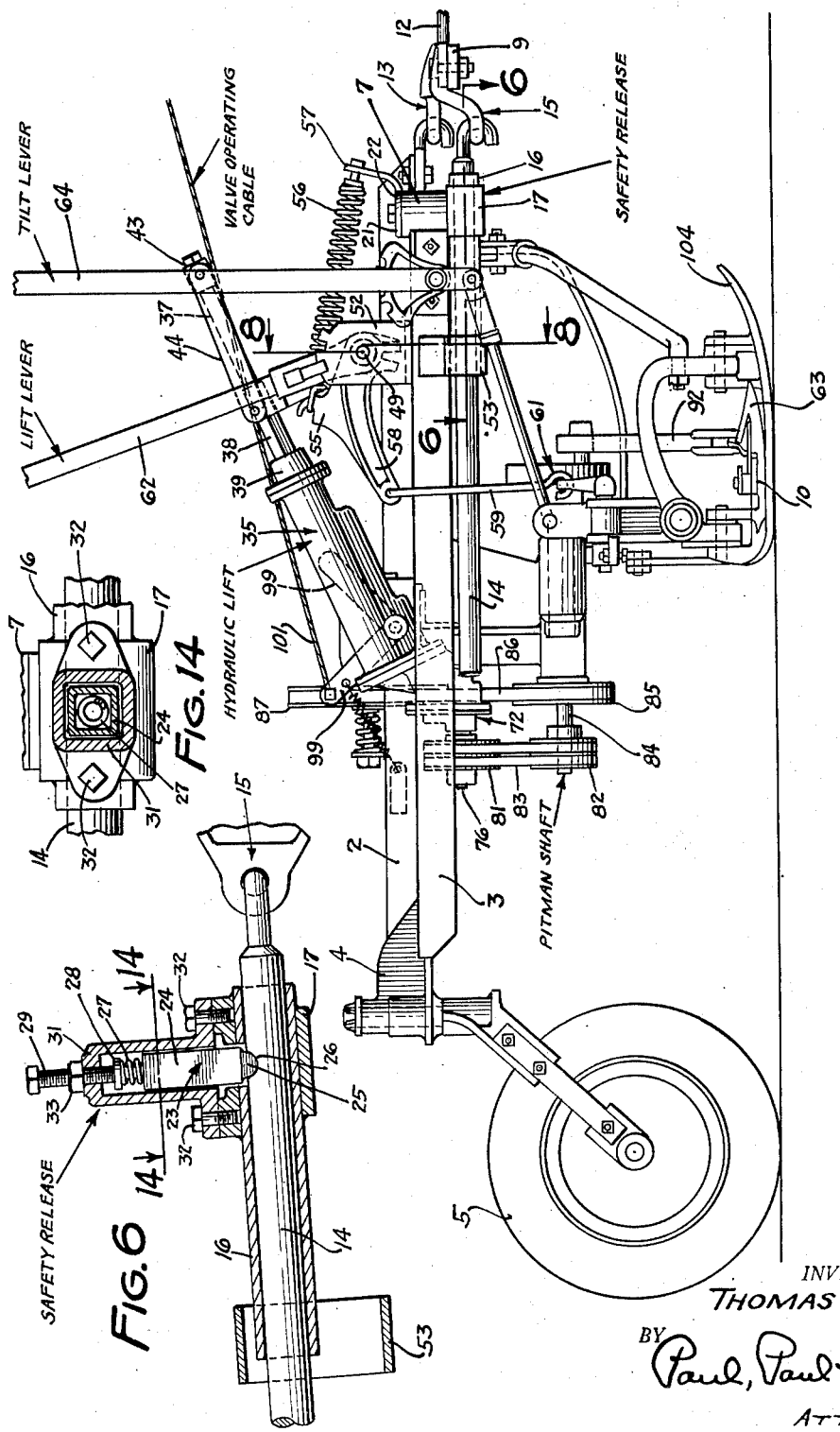
INVENTOR.
THOMAS E. ROSS
BY
Paul, Paul + Moore
ATTORNEYS

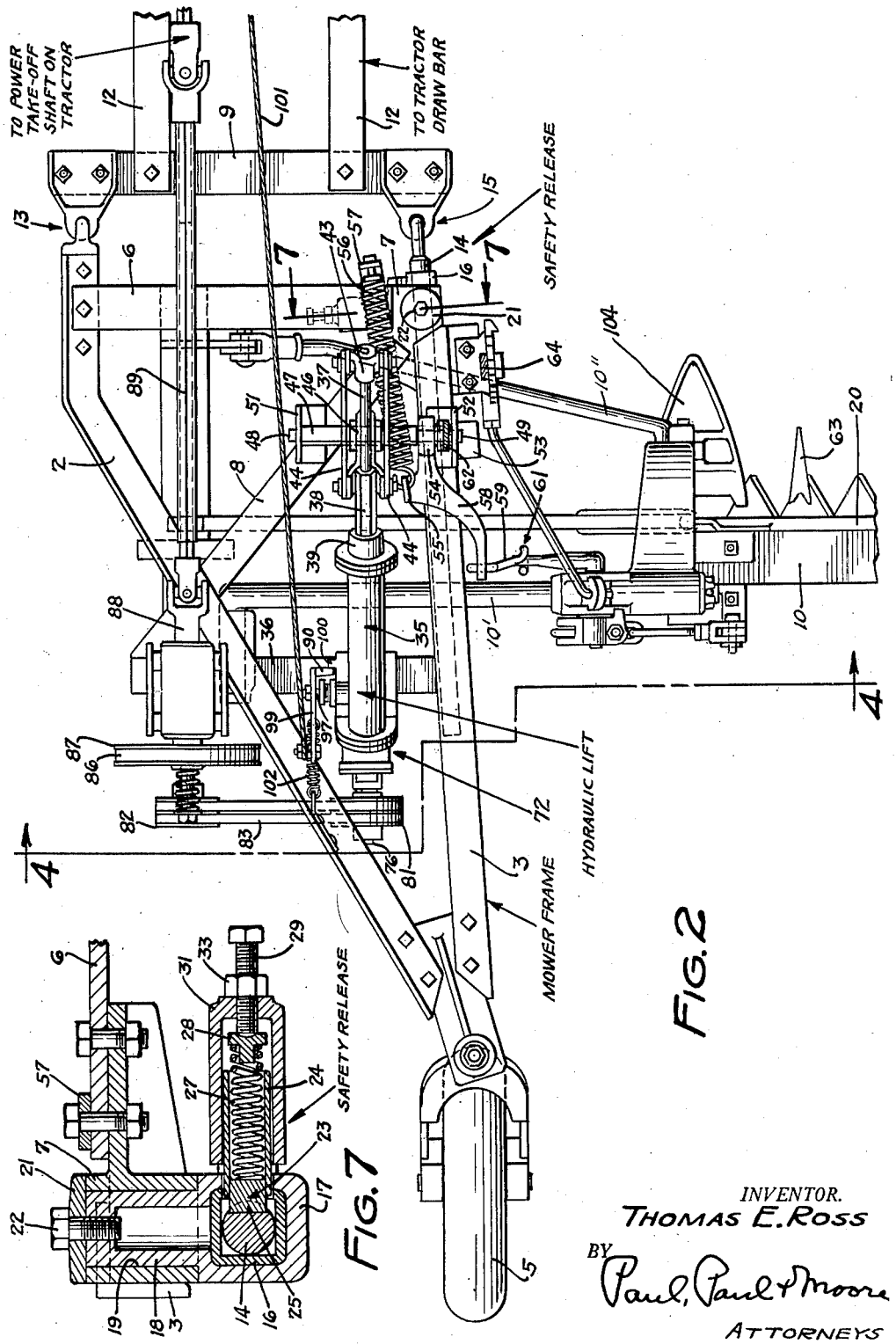

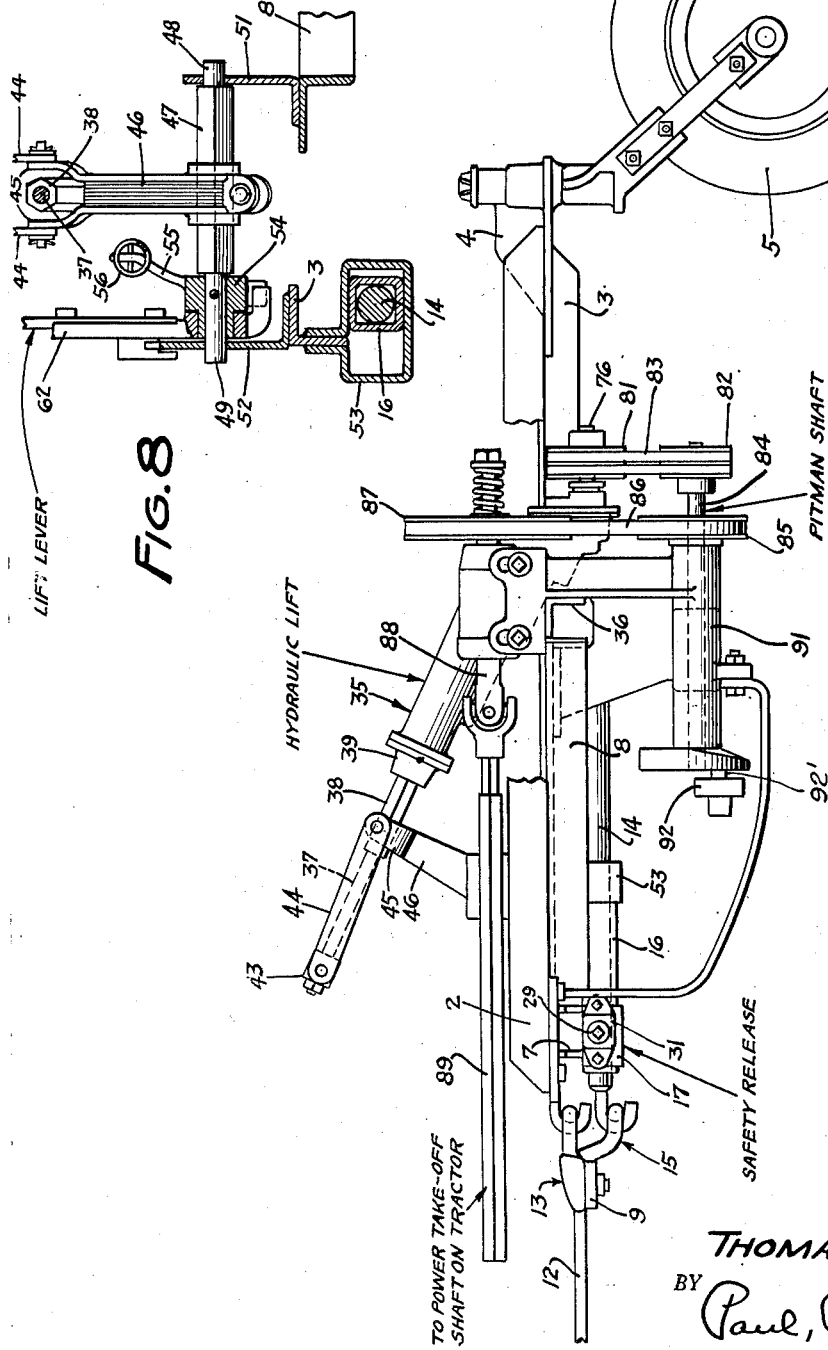

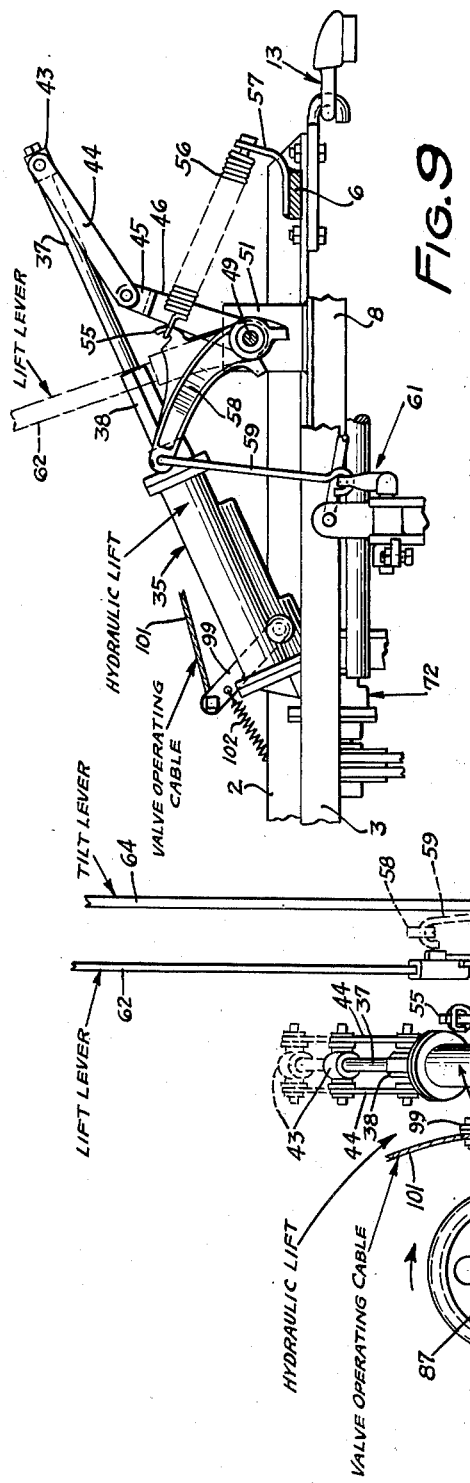

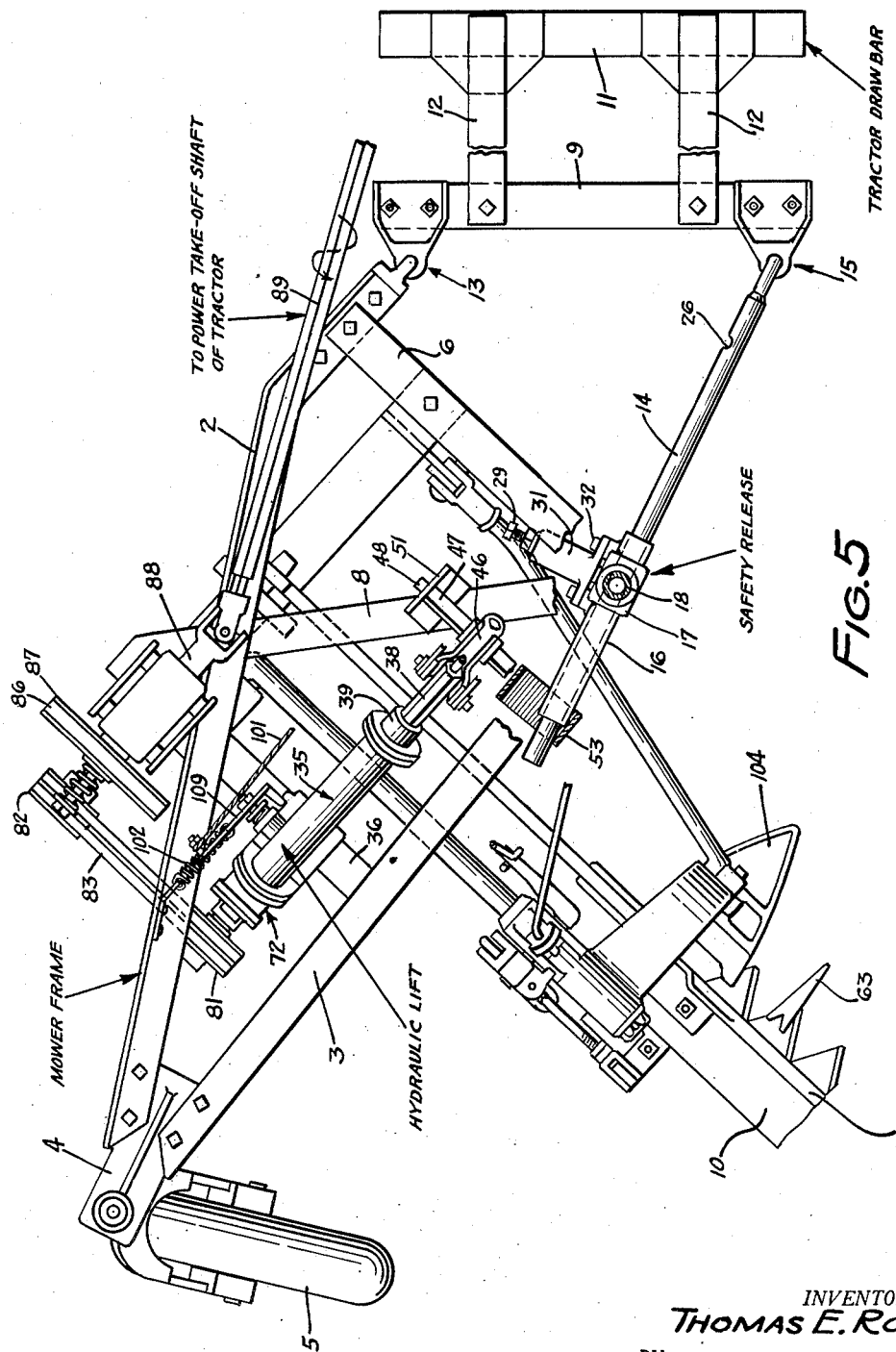

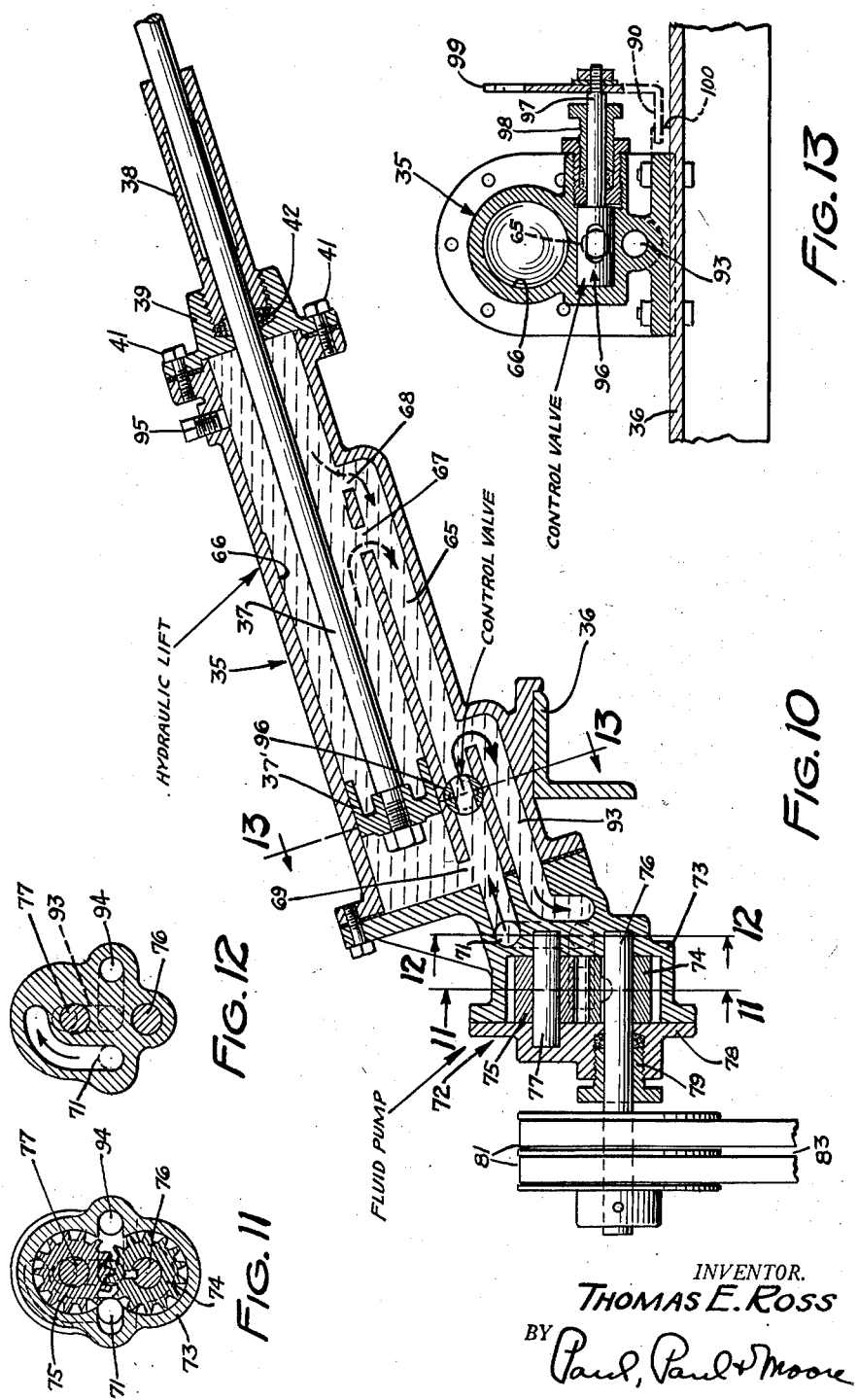

Patented Aug. 28, 1951

2,566,144

UNITED STATES PATENT OFFICE 2,566,144

HYDRAULIC LIFT FOR MOWER SICKLE BARS

Thomas Edwin Ross, Stillwater, Minn.

Application July 5, 1949, Serial No. 103,036

5 Claims. (Cl. 56—25)

This invention relates to new and useful improvements in mowing machines and more particularly to a novel hydraulic lift for the sickle bar of a mowing machine of the type used on farms or the like for mowing hay and various other crops.

Conventional mowing machines of the character herein disclosed are provided with means for raising and lowering the sickle bar whereby the sickle bar may be raised or elevated to clear obstructions when the mowing machine is in use. The various mechanisms now employed for thus lowering the sickle bar of a mowing machine have not proven entirely satisfactory, and the present invention therefore is directed to a novel operating mechanism for the sickle bar of a mowing machine whereby its sickle bar may be raised or lowered at the will of the operator seated on the vehicle propelling the mowing machine, such as a conventional tractor.

An important object of the present invention therefore is to provide an efficient and practical sickle bar operating mechanism which readily lends itself for mounting on conventional mowers whereby the sickle bar may be quickly raised from a horizontal to an elevated position to clear an obstruction disposed in the path of the sickle bar without interrupting the traveling movement of the tractor and mower, and without requiring the operator to leave his seat on the tractor.

A further object is to provide a hydraulically operated mechanism for raising the sickle bar of a mowing machine, comprising a cylinder mounted in fixed relation upon the frame of the mowing machine and having a plunger therein connected to the usual sickle bar operating mechanism, whereby when the plunger is projected from the cylinder by the manipulation of a single control valve, the sickle bar may be quickly elevated to pass over an obstruction disposed in its path.

A further and more specific object is to provide a hydraulic mechanism for raising the usual sickle bar of a mowing machine by the operation of a control valve having means whereby it may be conveniently manipulated by an operator seated on the tractor to which the mowing machine is coupled, said mechanism being so constructed and arranged that the sickle bar may be retained in an elevated position indefinitely, if so desired.

A further object is to provide a hydraulic lift of the class described comprising a cylinder and pump secured together to form in effect an integral structure, and the fluid circulating passages therein being so interconnected that the fluid is constantly being recirculated within the cylinder and pump, and whereby no additional reservoir or container is required for supporting a reserve supply of oil or fluid for the cylinder and pump.

A further object is to provide a hydraulic lift including a cylinder and piston assembly of simple and inexpensive construction, having means for mounting them as a unit on the supporting frame of a conventional mowing machine, and a rotary fluid pump being embodied in the base of the cylinder and interconnected with the interior of the cylinder to provide a closed circuit for the fluid, and whereby said hydraulic lift requires but a small quantity of fluid which is constantly being recirculated within the apparatus in readiness to actuate the piston or plunger, when the mowing machine is in operation and it is found necessary to raise the sickle bar, and means being provided in the construction of the cylinder for limiting the outward travel of the piston whereby should the operator inadvertently fail to manipulate the control valve to cause interruption of the outward travel of the piston, said piston will automatically open a by-pass and permit the pumped fluid to return to the pump, and whereby the piston may momentarily come to rest at the outer end of its stroke.

A further object is to provide a hydraulic lift for the sickle bar of a conventional mowing machine comprising a hydraulic cylinder having a plunger mounted therein and a rotary pump being secured to the base of the cylinder and having means for operatively connecting it to a source of power such as the usual power take-off shaft of the tractor to which the mowing machine may be coupled, said cylinder, pump, and pump drive means being constructed and assembled as a complete unit independently of the mowing machine, and whereby it may be quickly secured to the usual supporting frame of a conventional mowing machine.

Other objects of the invention reside in the simple and inexpensive construction of the hydraulic lift whereby it may be manufactured in quantity production at low cost; in the provision of a compact, self-contained hydraulic power device which may be operated with an extremely small quantity of fluid or oil and which does not require a reservoir for storing a surplus quantity of oil, as is common with most hydraulic transmissions now in use; and in the simple and inexpensive construction of the means for automatically releasing one side of the mowing machine frame from the transverse draft member, should the sickle bar accidentally strike an obstruction.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a side elevation of a mowing machine showing the invention embodied therein, the sickle bar being shown in its lowered or cutting position;

Figure 2 is a plan view of Figure 1;

Figure 3 is a side elevational view of the opposite side of the mowing machine frame to more clearly illustrate the drive for the fluid pump;

Figure 4 is a transverse sectional view on the line 4—4 of Figure 2, showing the drive for the fluid pump, and also indicating in full and dotted lines different positions of the sickle bar;

Figure 5 is a view similar to Figure 2 showing one side of the mowing machine frame released from the tractor, to permit the frame of the mowing machine to swing laterally to one side, should the sickle bar accidentally strike an obstruction while in operation;

Figure 6 is an enlarged detail sectional view on the line 6—6 of Figure 1, showing the spring-actuated locking bolt for normally retaining the frame of the mowing machine in longitudinal alignment with the tractor, as illustrated in Figure 2;

Figure 7 is an enlarged detail sectional view on the line 7—7 of Figure 2, to more clearly illustrate the construction of the spring-actuated locking bolt and its supporting means;

Figure 8 is a fragmentary sectional view on the line 8—8 of Figure 1, showing a portion of the sickle bar linkage to which the hydraulic operating mechanism is connected;

Figure 9 is a fragmentary detail view showing the piston of the hydraulic cylinder extended to elevate the sickle bar to the dotted line position shown in Figure 4;

Figure 10 is an enlarged detail sectional view of the hydraulic cylinder and its piston or plunger, and also showing the rotary fluid pump connected thereto;

Figure 11 is a detail sectional view on the line 11—11 of Figure 10 showing the interior construction of the fluid pump;

Figure 12 is a cross sectional view on the line 12—12 of Figure 10 showing the fluid passages in the pump housing and base of the cylinder for conducting fluid from the pump to the cylinder;

Figure 13 is a detail sectional view on the line 13—13 of Figure 10 showing the valve for controlling the circulation of the fluid between the pump and cylinder; and Figure 14 is a detail sectional view on the line 14—14 of Figure 6.

In the selected embodiment of the invention herein disclosed, there is illustrated in the accompanying drawings, a mowing machine of the type adapted to have its forward end coupled to a tractor or power vehicle, and whereby the forward end of the mower is supported directly upon the draw bar or coupling means of the tractor.

Mowing machine

The mowing machine, as herein disclosed, comprises a frame, substantially triangular in configuration, as shown in Figure 2, although it need not necessarily be so shaped. The frame comprises longitudinally extending side frame members 2 and 3 having their rear ends secured to a bracket 4 in which a suitable caster wheel 5 is mounted, shown in Figures 1, 2, 3 and 5. A cross member 6 has one end secured to the front end of the side member 2 and its opposite end to a bracket 7 to which the forward end of the opposed side frame member 3 is also secured. A diagonal brace 8 is shown interposed between the bracket 7 and the intermediate portion of the side frame member 2 and cooperates with the frame members 2, 3 and 6 to provide a very rugged and substantial structural frame.

The front end of the frame is pivotally connected to a draft member 9, shown secured to a member 11 which, for purposes of disclosure, may be considered the usual draft bar of a tractor. Suitable connecting members 12 may be utilized for securing the draft member 9 to the draw bar 11. The side frame member 2 is shown coupled to the draft member 9 by a coupling device, generally designated by the numeral 13, which permits the mower frame to be swung laterally to one side, when the opposite side thereof is released from the draft member 9, as will subsequently be described.

Safety release for sickle bar

A feature of the invention resides in the novel means for automatically releasing one corner of the mower supporting frame from the draft member 9, as shown in Figure 5, should the sickle bar 10 of the mower accidentally strike an obstruction when the mower is in operation. Such means is shown comprising a longitudinal draft member 14, preferably cylindrical in cross section, having its front end connected to the draft member 9 by a coupling device 15 similar to the coupling device 13 connecting the side frame member 2 to the draft member 9.

The draft member 14 is slidably received in an elongated guide 16 suitably secured in fixed relation to a member 17 having a cylindrical portion 18 received in a bearing 19 provided in the bracket 7. A retaining cap 21 is secured to the cylindrical bearing portion 18 by a suitable bolt 22 for rotatably securing the member 17 in the bracket 7 and whereby it is adapted for relative rotation therein.

Means is provided for locking the longitudinal member 14 in the guide 16 under normal operating conditions, and is shown comprising a spring-pressed bolt or member, generally designated by the numeral 23. The bolt 23 is shown comprising a hollow sleeve 24, preferably square in cross section, provided at one end with a plug 25 having a semi-cylindrical portion projecting from the sleeve adapted to be received in a notch 26 provided in the longitudinal coupling member 14, thereby to secure the member 14 in the sleeve 16. See Figures 6, 7 and 14.

The plug 25 is fixedly secured to the sleeve 24 and constitutes the bottom of said sleeve and also an abutment for one end of a suitable spring 27. The opposite end of the spring 27 may protrude slightly from the opposite end of the sleeve 24, and has a button or cap 28 seated thereagainst. An adjusting bolt or screw 29 engages the head of the button 28 and is adjustably received in threaded engagement with the end wall of the housing 31, as best shown in Figure 7. The housing 31 conceals the bolt 23 and the spring 27, and is detachably secured to the bracket 7 by suitable bolts 32, shown in Figures 6 and 14. A lock nut 33 is mounted on the screw 29 whereby the screw may be firmly locked in adjusted position.

The tension of the spring 27 is such as to retain the draft member 14 in its operative position, as shown in Figures 1 and 2, under normal operating conditions of the mower. Should the sickle bar 10 accidentally strike an obstruction, the locking bolt 23 will yield against the pressure of the spring 27 and thereby release the draft member 14 from the locking bolt 23. Such release of the draft member 14 will permit the rear end of the mower frame to be swung laterally to one side, as shown in Figure 5, whereby the sickle bar swings rearwardly, as indicated in Figure 5, thus providing adequate time for the operator of the tractor to interrupt the traveling movement of the mowing machine and elevate the sickle bar to clear the obstruction. When the obstruction has been cleared, the mowing machine frame is swung back to its normal position, shown in Figure 2, whereby the locking bolt will re-enter the notch 26 and thereby again secure the mowing machine frame in operative position rearwardly of the tractor.

Hydraulic lift for sickle bar

Another feature of the invention resides in the novel means provided for elevating the sickle bar to clear obstructions which may be disposed in its path, and whereby the sickle bar may be raised and lowered from the operator's seat on the tractor.

To thus hydraulically actuate the sickle bar in the event of an obstruction, a suitable hydraulic cylinder, generally designated by the numeral 35, is shown mounted on a cross member 36 having its end portions suitably secured to the side frame members 2 and 3, as illustrated in Figure 2. A piston 37' is provided within the cylinder 35 and has a piston rod 37 projecting from one end of a sleeve 38 received in threaded engagement with a head 39 secured to the upper end of the cylinder by bolts 41, as best illustrated in Figure 10. The sleeve 38 is preferably hexagonal in cross section whereby a wrench may readily be applied thereto to relatively rotate said sleeve to tighten the packing 42 around the piston rod to prevent leakage of the pressure fluid from the upper end of the cylinder.

The cylinder 35 is preferably disposed at an incline as shown in the drawings, to facilitate the coupling of the upper end of the piston rod to the usual linkage of the mower, as illustrated in Figure 1. A cross head 43 is suitably secured to the upper end of the piston rod 37 and has links 44 connecting it to forks 45 of an arm 46 shown secured to a square shaft 47 provided with end bearings 48 and 49, as best shown in Figure 8. The bearing 48 is shown supported in a bracket 51 which in turn is secured to the diagonal frame 51 which in turn is secured to the diagonal frame member 6, and the bearing 49 is supported in a bracket 52 secured to the side frame member 3, as shown in Figures 2 and 8.

A guide member 53 is shown secured to the depending web of the side frame member 3 to provide a support and guide for the rear end portion of the tubular guide 16 of the elongated draft member 14. Note particularly Figures 3 and 5. Secured to the shaft 47 is a hub 54 having an arm 55 to the upper end of which one end of a suitable spring or counter-balance 56 is secured. The opposite end of the spring 56 is anchored to a bracket 57 shown secured to the cross bar 6 at the forward end of the mower frame. See Figure 9. This spring or counter-balance means 56 tends to partially counter-balance the sickle bar 10 and its mounting arms 10' and 10''.

Also secured to the hub 54 is a rearwardly projecting lifting arm 58 having a link 59 operatively connecting it with the sickle bar 10 in the usual manner, as shown at 61 in Figures 1 and 4, whereby when the arm 58 is elevated by rotation of the shaft 47, the sickle bar may be raised from the full to the dotted line position shown in Figure 4.

The sickle bar 10 is shown pivotally mounted on the main supporting frame of the mower in the usual manner, as by pivot arms 10' and 10'', see Figure 4. The sickle bar, as is well known, is also mounted for tilting movement about a horizontal axis, thereby to adjust the usual guards 63 of the sickle bar with respect to the ground surface, as is well known. The tilting movement of the sickle bar is controlled by the tilt lever 64, which in the apparatus herein disclosed is manually actuated by the operator.

Fluid circulating means

Another important feature of the invention resides in the means provided for pumping or circulating the fluid within the cylinder 35 to operate the piston rod 37. As best shown in Figures 10 to 13, inclusive, the cylinder 35 has a fluid circulating passage 65 disposed in parallel relation to the cylinder bore 66 and in close proximity thereto. The upper end of the passage 65 is in communication with the interior of the cylinder through suitable ducts 67 and 68. The lower end of the passage 65 is in communication with the bottom end of the cylinder through a duct 69, and it also is in communication with the discharge 71 of a rotary pump, generally designated by the numeral 72.

The pump comprises a housing 73 in which is mounted suitable intermeshing toothed wheels 74 and 75, somewhat similar to conventional gear wheels, which are mounted respectively on shafts 76 and 77. The shafts are supported in suitable bearings provided in the pump housing and in the usual cap 78 of the pump housing, as best shown in Figure 10. The shaft 76 is supported in a packing box 79 and is shown provided with dual pulleys 81 which are operatively connected to twin pulleys 82 by suitable V-belts 83. See Figures 1, 2, 3, and 4.

The drive pulley 82 is shown secured to the usual pitman shaft 84 of the mower, and a second pulley 85 is also secured to said shaft and has a V-belt 86 operatively connecting it to a drive pulley 87. The pulley 87 is secured to a stub shaft 88 which in turn is driven from a telescoping shaft 89. The forward end of the shaft 89 is connected to the usual power takeoff shaft of the tractor, not shown. The pitman shaft 84 is shown mounted in a suitable bearing 91 and drives the usual pitman 92 by a pitman crank 92', as is well known in the art.

Referring to Figures 10 to 13, inclusive, the cylinder 35 is shown provided with a return fluid circulating passage 93 having one end in communication with the intermediate portion of the passage 65 and its opposite end in communication with the intake 94 of the pump. A suitable filler plug 95 is provided at the upper end of the cylinder whereby additional fluid may be introduced into the cylinder when necessary. A drain plug (not shown) may also be provided in the lower portion of the pump housing, if desired.

A suitable valve 96 is shown interposed in the lower end of the passage 65, and has an operating stem 97 supported in a suitable packing box 98 provided in the wall of the cylinder 35, as best illustrated in Figure 13. An operating arm 99 is secured to the stem or shaft 97 and is shown having one end of a rope or cable 101 attached thereto, the opposite end of which may be suitably attached to a fixed object on the tractor adjacent the operator's seat, whereby the operator may conveniently operate the valve 96 to control the raising and lowering of the sickle bar from the driver's seat.

A suitable spring 102 is secured to the valve arm 99 for constantly returning the valve to its closing position, as shown in Figure 1. The valve is moved into open position by exerting a pull upon the cable 101 to shift the lever 99 into the dotted line position shown in Figure 1.

Operation

In the operation of the novel apparatus herein disclosed, the guide 16 is moved forwardly on the draft member 14 to the position shown in Figures 1 and 2, whereupon the locking bolt 23 will engage the notch 26 in the draft member 14, and thereby secure the tractor frame in operative position relative to the tractor. When the mower is being propelled or transported from one place to another by the tractor, the sickle bar may be swung upwardly to an upright position in the usual manner, and the lift lever 62 is then actuated to lift the inner shoe 104 of the sickle bar off the ground as is well known. Suitable means, not shown, and well known in the art, is provided for retaining the sickle bar in its vertical inoperative position.

When the cutting operation is to be started, the sickle bar is lowered to a horizontal position or to the dotted line position shown in Figure 4, and the lift lever is then manipulated to lower the sickle bar into engagement with the ground, as shown in full lines in Figure 4.

The operator may then manipulate the usual transmission on the tractor to drive the power takeoff shaft, whereupon power is transmitted to the belt drive 85—86—87 through the telescopic shaft 89, whereupon the pitman shaft 84 is rotated thereby to impart reciprocal movement to the usual sickle 20 of the sickle bar 10, as is well known. Rotation of the pitman shaft 84 will simultaneously operate the pump 72 because of the belt drive 83. The tractor is then advanced and the cutting operation started in the usual manner. Should the operator discover an obstruction in the path of the sickle bar, he may exert a pull on the cable 101, whereby the valve 96 is closed and thereby causes the fluid discharging from the pump to be directed into the cylinder below the piston 37'. As the fluid is thus directed into the cylinder below the piston, said piston is moved upwardly towards the opposite end of the cylinder, thereby actuating the lifting linkage 59 of the sickle bar and elevating the sickle bar to the dotted line position shown in Figure 4.

When the piston passes the port 67 in the cylinder wall, the fluid is bypassed back to the pump through the port 67, upper end of the passage 65, and the return passage 93, to the pump. The port 68 above the port 67 permits the oil in the uppermost end of the cylinder to return to the pump, as indicated by the arrow in Figure 10.

When the sickle bar has passed over the obstruction, the operator releases his grip on the cable 101, whereupon the valve 96 is returned to its normal open position by the spring 102, as shown in Figure 10. When the valve is thus opened, the sickle bar will return by gravity to its cutting position on the ground because the fluid pressure in the lower portion of the cylinder below the piston is released through the open valve, as will be understood by reference to Figure 10. In other words, when the valve is in open position as shown in Figure 10, the piston may be freely reciprocated within the cylinder because the fluid in the cylinder and the fluid passages in communication therewith may circulate freely from one end of the cylinder to the other as the piston is reciprocated within the cylinder.

If desired, the downward movement of the sickle bar may be retarded by only partially opening the valve 96, thereby to restrict the flow of fluid through the valve. When the valve is wide open, as shown in Figure 10, the weight of the sickle bar and the parts connected directly therewith will cause the sickle bar to quickly gravitate to its cutting position in engagement with the ground. It will thus be seen that the raising and lowering of the sickle bar may be conveniently controlled by the operator seated upon the tractor, by the simple manipulation of the cable 101.

As hereinbefore stated the unique construction and arrangement of the cylinder 35, pump 72, and fluid circulating passages therebetween, are of extreme importance in that it makes it possible to completely assemble the cylinder, piston and pump, as a complete unit, independently of the mower or other apparatus with which it is to be used. The cylinder and pump are continually interconnected and oil is constantly being circulated between the pump and passages 65 and 93 when the valve 96 is open, as indicated by the full line arrows in Figure 10.

The cylinder pump and all fluid passages are always filled with fluid, whereby the piston will respond instantly when the control valve 96 is manipulated to restrict fluid flow therethrough. The valve lever 99 may be provided at its lower end with an offset portion 90 adapted to engage a stop 100, when the valve is retained in valve-opening position by the spring 102, as shown in Figures 1, 10 and 13, and whereby the valve 96 is normally retained in wide open position, as best shown in Figure 10. During the upstroke of the piston, the fluid in the upper end of the cylinder will return to the pump through the passages 65 and 93. The reciprocal movement of the piston within the cylinder may be varied, as desired, by manipulation of the control valve 96. The sickle bar may be retained in any desired position by actuation of the fluid control valve from the operator's seat on the tractor.

The cylinder and pump are completely closed to the atmosphere and provide a sealed chamber for the fluid, whereby leakage of fluid is substantially eliminated. The combined capacities of the cylinder, pump and interconnecting passages in lifting apparatus such as herein disclosed need not be more than one quart. A high temperature oil is preferably utilized.

The cylinder and pump do not require a separate fluid reservoir or tank, as is common with most hydraulic pumps used in connection with known hydraulic tractor lifts. The pump may be conveniently operated from the pitman shaft 84, as shown in Figures 3 and 4, or it may be driven directly from the telescopic shaft 89, if desired. If the hydraulic sickle bar lift herein disclosed is to be used in connection with a horse-drawn mower, the pump may be driven from the pitman shaft thereof, or from some other driving member of the mower.

The unitary construction of the cylinder and pump greatly facilitates the operation of mounting the apparatus upon the mower with the piston rod so disposed that it may readily be connected to the usual sickle bar lifting linkage of the mower. The forward end of the valve operating cable 101 may be adapted for hand operation or, if desired, it may be secured to a foot pedal, not shown, whereby the cable may be manipulated by foot pressure. In some instances it may be arranged for both hand and foot operation. The lifting apparatus may be raised or lowered at any time while the sickle 20 is in operation.

The safety release for the sickle bar is a highly desirable feature of the apparatus as it substantially eliminates damage to the sickle bar in the event the sickle bar accidentally strikes an obstruction when the mower is in operation. The operative connection between the draft member 14 and the locking bolt 23 is such that under normal operation of the mower, the locking bolt will not release the draft member 14, even though the mower may be cutting a very heavy crop. It is only when the sickle bar strikes an obstruction whereby forward movement of the sickle bar is suddenly resisted, that the locking bolt will yield and release the draft member 14.

Such automatic release of the member 14 will permit the mower frame to swing laterally to one side, as shown in Figure 5, whereby the sickle bar 10 may swing clear of the obstruction. The lateral shifting of the mower frame, as shown in Figure 5, does not effect the operation of the hydraulic lift or the driving connection between the power takeoff shaft and the pump.

The hydraulic lifting mechanism is extremely simple and inexpensive in construction, and readily lends itself for manufacture in quantity production at low cost. The safety release for the sickle bar, best shown in Figures 1, 5, 6 and 7, also presents the utmost in simplicity and performance and is a highly desirable feature, particularly when used in conjunction with a power operated mowing machine, as herein disclosed.

It will be apparent to those skilled in the art that I have accomplished at least the principal objects of my invention, and it will also be apparent to those skilled in the art that the embodiments herein described, may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. A mowing machine for use with a tractor having a power take-off shaft and a drawbar, comprising a wheel supported frame, coupling means for detachably connecting said supporting frame to the drawbar, a sickle bar having a knife mounted for oscillation thereon, said sickle bar extending transversely from said frame, linkage connecting said sickle bar to said frame and adapted when actuated to lift said sickle bar, a pitman shaft having a pitman crank journalled to said frame, a pitman connecting the pitman crank to said knife for oscillating the knife, a drive shaft means journalled on said frame and having one end detachably connectable to said power take-off of said tractor, a drive connection between said drive shaft and pitman shaft means, means for raising and lowering said sickle bar comprising a lift arm pivotally mounted on said frame, a link connecting said lift arm and said linkage connecting the sickle bar to the frame, a hydraulic cylinder and piston rod assembly mounted on the frame, link means connecting said lift arm and said piston rod, and a counter-balance means connected to said lift arm and to said frame for partially counter-balancing said sickle bar and its mounting means, a pump mounted on said frame and having fluid circulating passageways connecting it to said cylinder, a drive connection between said drive shaft and the pump, said fluid passageways having a manually controlled valve therein for controlling the circulation of fluid between the pump and cylinder thereby to control the operation of the piston for elevating and lowering the sickle bar and means for operating said valve.

2. A mowing machine of the character described in claim 1 further characterized in that said means connecting said piston and said linkage connecting said sickle bar to said frame comprises a lift arm pivotally mounted on said frame, a link connecting said lift arm and said linkage connecting the sickle bar to the frame, a second arm pivotally mounted on said frame, means connecting said second arm and said lift arm whereby pivotal movement of said second arm is imparted to pivot said lift arm, link means connecting said second arm and piston.

3. A mowing machine of the character described in claim 1 futher characterized in that said means connecting said piston and said linkage connecting said sickle bar to said frame comprises a bell-crank lever pivotally mounted on said frame, a link connecting a lift arm of said bell-crank lever and said linkage connecting said sickle bar to said frame, and a link means connecting the other arm of said bell-crank lever and said piston.

4. A mowing machine of the character described in claim 3 further characterized in that said counter-balance means comprises a spring means disposed so as to be connected with one end to said frame and the other end to said lift arm partially to counter-balance said sickle bar and its mounting means.

5. A mowing machine of the character described in claim 1 further characterized in that said hydraulic cylinder and piston, the pump, and said fluid circulating passageways having a manually controlled valve therein, are a single subassembly mounted on said frame.

THOMAS EDWIN ROSS.

REFERENCES CITED

The following references are of record in the file of this patent:

UNITED STATES PATENTS

| Number | Name | Date |
|---|---|---|
| 1,223,741 | Schwister | Apr. 24, 1917 |
| 1,907,024 | Willard et al. | May 2, 1933 |
| 1,917,011 | Bird | July 4, 1933 |
| 1,946,541 | Coultas et al. | Feb. 13, 1934 |
| 1,977,429 | Crumb et al. | Oct. 16, 1934 |
| 2,148,311 | Vutz | Feb. 21, 1939 |
| 2,171,761 | Paradise et al. | Sept. 5, 1939 |
| 2,310,388 | Blair | Feb. 9, 1943 |
| 2,311,117 | MacDonald et al. | Feb. 16, 1943 |
| 2,331,863 | Schroeppel | Oct. 12, 1943 |
| 2,375,912 | Gifford et al. | May 15, 1945 |
| 2,502,805 | Spurlin | Apr. 4, 1950 |